United States Patent
Ogasawara et al.

(10) Patent No.: US 6,759,067 B1
(45) Date of Patent: *Jul. 6, 2004

(54) METHOD FOR PRODUCING ACIDIC MILK BEVERAGES

(75) Inventors: Nobuhiro Ogasawara, Tokyo (JP); Tamotsu Setoyama, Tokyo (JP); Michitoshi Anbe, Tokyo (JP)

(73) Assignee: Kabushiki Kaisha Yakult Honsha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 107 days.

(21) Appl. No.: 09/233,197

(22) Filed: Jan. 20, 1999

(30) Foreign Application Priority Data

Feb. 17, 1998 (JP) .......................................... 10-034466

(51) Int. Cl.⁷ ................................................. A23C 9/12
(52) U.S. Cl. ...................... 426/34; 426/580; 426/583; 426/519
(58) Field of Search .......................... 426/34, 580, 583, 426/42, 43, 573, 574, 634, 519

(56) References Cited

U.S. PATENT DOCUMENTS

| | | |
|---|---|---|
| 5,112,964 A | 5/1992 | Aoe et al. |
| 5,342,641 A | 8/1994 | Masutake et al. |
| 5,710,270 A | 1/1998 | Maeda et al. |

OTHER PUBLICATIONS

Takahashi et al., Patent Abstract of Japan, abstracting JP 06–78667, Mar. 1994.*
Toyama et al., Patent Abstracts of Japan, abstracting JP 07–59512, Mar. 1995.*
Tamime et al., Yoghurt Science and Technology, 1985, Pergamon Press, Oxford, pp. 25–31 and 43–47.*

* cited by examiner

Primary Examiner—Leslie Wong
(74) Attorney, Agent, or Firm—Oblon, Spivak, McClelland, Maier & Neustadt, P.C.

(57) ABSTRACT

The invention is directed to a method for producing acidic milk beverages, characterized by homogenizing fermented milk, then adding water-soluble hemicellulose thereto for mixing, followed by an additional step of homogenization. The method provides stable acidic milk beverages which undergo less sedimentation or separation of whey during product storage, and which have favorable flavor.

9 Claims, No Drawings

METHOD FOR PRODUCING ACIDIC MILK BEVERAGES

BACKGROUND OF THE INVENTION

1. Field of the Invention

The present invention relates to a method for producing an acidic milk beverage which has stable properties and undergoes less sedimentation or separation of whey during product storage.

2. Related Art

Conventionally, acidic milk beverages containing live bacteria, such as fermented milk, have widely been consumed as health-promoting beverages having physiological activities such as activity that promotes intestinal health and immunopotentiating activity. Also, since a culture liquid (fermented milk) of lactic acid bacterium or biffidobacterium has a unique flavor, it is sterilized and used for production of acidic milk beverages.

Acidic milk beverages as described above are desirably stable and undergo less sedimentation and less separation of whey. Stability of lactic acid bacteria beverages is intimately related to casein protein, one of the components of milk. When the pH of the product approaches 4.6, which is the optimum pH of casein protein, molecules of casein protein coagulate and precipitate, forming sediment at the bottom of the container, or separation of whey. From this, reducing pH of acidic milk beverages to a value far less than 4.6 is considered desirable. However, in view that milk beverages having a pH value of less than 3.5 have poor flavor, the above approach of reducing pH has limitations. Thus, in order to stabilize acidic milk beverages, currently, homogenization or addition of a stabilizer is generally performed. As stabilizers, pectin and carboxymethylcellulose (CMC) are used. However, use of these stabilizers may impart a viscous tint to the product, rendering an unfavorable texture in terms of flavor. In addition, pectin and CMC are problematic in that they gelatinize the product within a low pH range.

Japanese Patent Application Laid-Open (kokai) No. 7-59512 discloses that stable acidic milk beverages which do not provide unfavorable pasty sensation can be obtained by subjecting dairy products such as milk to fermentation by lactic acid bacteria in the presence of water-soluble hemicellulose originating from soybeans (hereinafter referred to as a soybean polysaccharide). However, soybean polysaccharides have relatively weak stabilizing power, and therefore, addition thereof in small amounts cannot attain satisfactory stabilizing results; whereas addition in large amounts increases production costs and impairs flavor of the acidic milk beverage.

Stability is well known to depend on the concentration of solid matter, or in other words, on product viscosity. That is, the higher the viscosity, the greater the effect of suppressing coagulation of casein protein, to thereby improve stability. As the solid matter, a sweetener such as sugar is generally used. However, in order to meet recent, mounting demands resulting from consumers' keen awareness of nutrition which call for low calorie products and beverages having light flavor, sugar and other sweetening agents which have heretofore been used have come to be used in smaller amounts. This also places limitation on stabilization of products achieved by increasing the content of solid matter.

In view of the foregoing, the present inventors have conducted extensive studies, and have found that when water-soluble hemicellulose such as a soybean polysaccharide is used as a stabilizer in the production of an acidic milk beverage, and two or more steps of homogenization treatments are performed at specific stages of the production process, there can be obtained an acidic milk beverage which is endowed with excellent stability and remarkable texture, thus leading to completion of the invention.

Accordingly, a general object of the present invention is to provide an industrially advantageous method—which has minimal effect on product flavor and texture—for producing an acidic milk beverage providing no unfavorable pasty sensation and exhibiting excellent storage stability.

In one aspect of the present invention, there is provided a method for producing an acidic milk beverage, characterized by homogenizing fermented milk, then adding water-soluble hemicellulose thereto for mixing, followed by an additional step of homogenization.

In another aspect of the present invention, there is provided a method for producing an acidic milk beverage, characterized by homogenizing fermented milk, then adding thereto a mixture of water-soluble hemicellulose and a dairy product for mixing, followed by an additional step of homogenization.

MODES FOR CARRYING OUT THE INVENTION

In the present invention, acidic milk beverages refer to live-bacteria-containing beverages such as fermented milk, dairy products, and lactic acid bacteria beverages; milk-type beverages containing sterilized fermented milk; and kefir and the like, all of which are defined by the "Ministerial Ordinance concerning Compositional Standards, etc. for Milk and Dairy Products (Japan Ministry of Agriculture)." Generally, these beverages are manufactured by mixing fermented milk and syrup solution which are prepared separately. As used herein, fermented milk refers to a sterilized or unsterilized solution obtained by cultivating lactic acid bacteria, bifidobacteria, yeast, or the like in an undiluted or diluted dairy product such as fresh milk, e.g., cow's milk and goat's milk; skim milk powder; whole milk powder; and fresh cream. In the present invention, the dairy product may be used singly or in combination of two or more, in consideration of flavor of the acidic milk beverage and characteristics of the bacterial strain. Also, in the present invention, the term "dairy product" means a product containing milk protein. Particularly preferred dairy products are reconstituted milk prepared from whole milk powder or skim milk powder.

As used herein, a syrup solution refers to a solution containing a sweetener. In some cases, the syrup solution may contain a stabilizer and the like. Preferable sweeteners for dietary purposes include diet sweeteners such as aspartame, stevia, and saccharine. A stabilizer such as water-soluble hemicellulose, a flavoring agent, and other ingredients such as nutrients may be prepared separately from the syrup solution, or may be incorporated into the syrup solution.

In the present invention, fermented milk is firstly homogenized. Homogenization may be performed by a conventional method using a homogenizer, preferably under a pressure of 100–250 kg/cm$^2$, more preferably about 150 kg/cm$^2$. A high pressure does not particularly affect the stability of the end product.

Next, water-soluble hemicellulose is added to fermented milk which has undergone homogenization.

Examples of water-soluble hemicellulose usable in the present invention include that originating from oil seeds (soybeans, palm trees, coconuts, corns, cotton seeds, etc.) and/or cereal grains (rice, wheat, etc.), preferably that originating from beans, especially soybeans, more preferably that originating from the cotyledons of soybeans. For example, hemicellulose originating from soybeans is polysaccharide composed of rhamnose, fucose, arabinose, xylose, galactose, glucose, and uronic acid. The molecular weight of the water-soluble hemicellulose is 1,000,000 or less as measured by the limiting viscosity method using standard pullulan (available from Showa Denko K.K.) as the standard substance. As the raw material of water-soluble hemicellulose, there are used hulls or cakes which are obtained by removing fat, protein, and starch from oil seeds and/or cereal grains. The raw material is heat-decomposed preferably at 80–130° C., more preferably 100–130° C., around a pH corresponding to the isoelectric point of the protein contained therein. Water-soluble fractions are fractionated from the reaction mixture. As needed, the fractions are subjected to treatment with activated charcoal, treatment with adsorptive resin, ethanol precipitation, and the like, thereby removing hydrophobic substances and low molecular substances. When the fractions are dried, the target water-soluble hemicellulose is obtained. In the present invention, the water-soluble hemicellulose may be obtained from the market.

The water-soluble hemicellulose may be added alone or as a mixture with the dairy product. If the water-soluble hemicellulose is added after being mixed with the dairy product, stability is improved, and the bacterial volume and pH can be controlled with ease. Examples of the dairy product usable in the present invention include fresh milk such as cow's milk and goat's milk, skim milk powder, whole milk powder, fresh cream, and the like. A preferable dairy product is reconstituted milk prepared from whole milk powder or skim milk powder. The dairy product may be used as it is, after being diluted, or after being condensed. Also, the dairy product may be used singly or in combination of two or more. The water-soluble hemicellulose may be incorporated into the above-mentioned syrup solution, or may be added together with the above-mentioned dairy product. In an acidic milk beverage serving as a final product, the concentration of water-soluble hemicellulose is 0.1–1.0 wt.%, preferably 0.2–0.6 wt.%. Excessively high concentration of the water-soluble hemicellulose may provide adverse effects on flavor, such as smell of soybeans. Also, excessively low concentration of the water-soluble hemicellulose may provide insufficient stability of the acidic milk beverage.

In order to improve the flavor, characteristics, and the like of an acidic milk beverage, acid may be added during the manufacture thereof so as to regulate pH. In view of flavor, examples of preferred acids include citric acid, malic acid, and the like. Acids may be added either to syrup solution or to the final product.

After the above-mentioned mixing procedure, homogenization is performed again. The second homogenization may be performed under the same conditions as in the first homogenization. Following the mixing procedure, there may be performed final treatment such as dilution with water or addition of arbitrary ingredients before the final products are obtained. In such cases, the second homogenization may be performed after the final treatment.

In the case of manufacture of a live-bacteria-containing beverage, regulation of non-fat milk solid matter or the number of bacteria may be required for conformity with the "Ministerial Ordinance concerning Compositional Standards, etc. for Milk and Dairy Products." The second homogenization may be performed after such regulation.

EXAMPLES

The present invention will next be described by way of examples. However, the invention is not limited only to the examples, wherein "%" used in Examples hereunder represents "g/ml %."

Test Example 1

Study on the point(s) within the production process at which homogenization is performed and the number of repetitions of homogenization:

A product formulation considered to have relatively unstable storage stability was designed, and products based on this formulation were prepared through fourteen different methods. The resultant products were stored at 10° C., and the effects of the point(s) within the production process at which homogenization was performed and the number of repetitions of homogenization on product properties during storage was investigated. The amount of separated whey and the amount of sediment at the bottom of the bottle were used as indices for evaluation.

The amount of sedimentation (wt.%) was determined as follows.

A lid was removed from a container containing a sample, and the container containing a sample was weighed. (Weight of the sample-containing container: A)

A sample within the container was gently poured out, then the container was placed upside down for one minute, and the container was weighed after cleaning of the sample collected around the opening. (Weight of container plus sediment: B)

The container was washed and weighed. (Weight of clean container: C)

$$\text{Sediment (wt \%)} = \{(B-C)/(A-C)\} \times 100$$

1) Preparation of Ingredient Solutions

Fermented milk: 16% skim milk powder was dissolved in 60° C. water, sterilized, and then inoculated with *Lactobacillus casei* (FERM BP-1366) to culture until the solution had a pH of 3.6.

Syrup solution: 30% fructose and 2% soybean polysaccharide (SM-900, manufactured by San'eigen FFI) were dissolved in 60° C. water, and the resultant solution was sterilized at 100° C. for 5 minutes to prepare a syrup solution.

Skim milk powder solution: skim milk powder was dissolved in 60° C. water, and the resultant solution was sterilized at 100° C. for 5 minutes to prepare 16% skim milk powder solution.

2) Methods for Preparing Stock Solutions

In preparation of stock solutions, either one of the following two series of processing was used:

T-1 series: After the fermented milk and the skim milk powder solution prepared in step 1) were mixed, the syrup solution was incorporated to the resultant mixture to prepare a stock solution.

T-2 series: After the skim milk powder solution and the syrup solution were mixed, the fermented milk was incorporated to the resultant mixture to prepare a stock solution.

In this step, the mixing proportions of the ingredient solutions were as follows: fermented milk (163 parts by weight), syrup solution (172 parts by weight), and skim milk powder solution (82 parts by weight). Water (600 parts by weight) was added to the resultant mixture to yield a final product.

3) Homogenization Conditions

Seven different conditions were set for each case of T-1 and T-2 series. The stages in process where homogenization was performed and the number of repetitions of homogenization are shown in Table 1. The pressure applied during homogenizing was 150 kg/cm$^2$.

TABLE 1

|   |   | Ingredient to which skim milk powder solution was added | Homogenization of fermented milk | Homogenization of stock solution | Homogenization of end product |
|---|---|---|---|---|---|
| T-1 | T-1a | Fermented milk | yes | yes | yes |
|   | T-1b |   | yes | yes | no |
|   | T-1c |   | yes | no | yes |
|   | T-1d |   | yes | no | no |
|   | T-1e |   | no | yes | yes |
|   | T-1f |   | no | yes | no |
|   | T-1g |   | no | no | yes |
| T-2 | T-2a | Syrup solution | yes | yes | yes |
|   | T-2b |   | yes | yes | no |
|   | T-2c |   | yes | no | yes |
|   | T-2d |   | yes | no | no |
|   | T-2e |   | no | yes | yes |
|   | T-2f |   | no | yes | no |
|   | T-2g |   | no | no | yes |

TABLE 2

|   | T-1a | T-1b | T-1c | T-1d | T-1e | T-1f | T-1g |
|---|---|---|---|---|---|---|---|
| pH |   |   |   |   |   |   |   |
| Day 1 | 4.13 | 4.13 | 4.13 | 4.13 | 4.13 | 4.13 | 4.13 |
| Day 7 | 4.06 | 4.06 | 4.06 | 4.06 | 4.06 | 4.06 | 4.06 |
| Day 14 | 4.03 | 4.02 | 4.02 | 4.02 | 4.02 | 4.02 | 4.02 |
| Day 21 | 3.96 | 3.96 | 3.96 | 3.96 | 3.95 | 3.95 | 3.94 |
| Separation of whey (mm) |   |   |   |   |   |   |   |
| Day 7 | 5 | 6 | 7 | 7 | 6 | 8 | 7 |
| Day 14 | 9 | 10 | 10 | 13 | 9 | 12 | 11 |
| Day 21 | 12 | 13 | 12 | 19 | 17 | 18 | 18 |
| Sedimentation at the bottle bottom (%) |   |   |   |   |   |   |   |
| Day 7 | 1.02 | 1.24 | 1.06 | 1.65 | 1.28 | 2.07 | 1.53 |
| Day 14 | 1.30 | 1.64 | 1.45 | 2.05 | 1.81 | 2.56 | 2.15 |
| Day 21 | 1.88 | 2.23 | 1.98 | 2.66 | 2.51 | 3.35 | 2.66 |

TABLE 3

|   | T-2a | T-2b | T-2c | T-2d | T-2e | T-2f | T-2g |
|---|---|---|---|---|---|---|---|
| pH |   |   |   |   |   |   |   |
| Day 1 | 4.13 | 4.14 | 4.14 | 4.14 | 4.13 | 4.14 | 4.13 |
| Day 7 | 4.06 | 4.07 | 4.07 | 4.07 | 4.06 | 4.06 | 4.06 |
| Day 14 | 4.01 | 4.01 | 4.03 | 4.03 | 4.03 | 4.03 | 4.03 |
| Day 21 | 3.95 | 3.96 | 3.97 | 3.96 | 3.96 | 3.96 | 3.96 |
| Separation of whey (mm) |   |   |   |   |   |   |   |
| Day 7 | 5 | 6 | 6 | 8 | 6 | 5 | 7 |
| Day 14 | 7 | 7 | 6 | 10 | 6 | 9 | 8 |
| Day 21 | 11 | 12 | 12 | 20 | 11 | 15 | 13 |
| Sedimentation at the bottle bottom (%) |   |   |   |   |   |   |   |
| Day 7 | 0.58 | 0.68 | 0.66 | 1.42 | 0.71 | 0.83 | 0.73 |
| Day 14 | 0.79 | 0.87 | 0.88 | 1.71 | 0.88 | 1.05 | 1.00 |
| Day 21 | 1.20 | 1.16 | 1.20 | 2.12 | 1.36 | 1.49 | 1.45 |

As is apparent from Tables 2 and 3, Samples T-1a, T-1b, T-1c, T-2a, T-2b, and T-2c, which were obtained through homogenization of fermented milk followed by homogenization of a stock solution and/or an end product, produced less sedimentation and less separation of whey than did other samples, providing stable milk beverages.

Test Example 2

Study on the point(s) within the production process at which homogenization is performed and the number of repetitions of homogenization:

Fermented milk and syrup solution containing soybean polysaccharide were prepared individually, and products were manufactured through five different methods described below. The resultant products were stored at 10° C., and the effects of the point(s) within the production process at which homogenization was performed and the number of repetitions of homogenization on product properties during storage was investigated. The amount of separated whey and the amount of sediment at the bottom of the bottle were used as indices for evaluation.

1) Preparation of Ingredient Solutions

Fermented milk: 21% skim milk powder solution was sterilized at 121° C. for one minute, and then was inoculated with *Lactobacillus case* (FERM BP-1366) to culture until the solution had pH 3.9.

Syrup solution: 20% fructose and 1.33% soybean polysaccharide (SM-900) were dissolved in 60° C. water, and were sterilized at 100° C. for 5 minutes to prepare a syrup solution.

2) Production Method

The mixing proportions of these ingredient solutions were as follows: fermented milk (174 parts by weight) and syrup solution (226 parts by weight). Water (600 parts by weight) was added to the resultant mixture to yield a final product. The pressure applied during homogenization was 150 kg/cm$^2$. The following five different methods were used.

Sample A: After homogenization of fermented milk, a syrup solution was added thereto and the mixture was homogenized again to obtain a stock solution.

Sample B: After homogenization of fermented milk, a syrup solution was added thereto (without homogenization) to obtain a stock solution.

Sample C: Fermented milk and a syrup solution were mixed, and then the resultant mixture was homogenized twice consecutively to obtain a stock solution.

Sample D: Fermented milk and a syrup solution were mixed, and then the resultant mixture was homogenized to obtain a stock solution.

Sample E: Fermented milk was homogenized twice consecutively, and then a syrup solution was added thereto (without homogenization) to obtain a stock solution.

3) Results

The storage stability data of respective series are shown in Table 4.

TABLE 4

|   |   | A | B | C | D | E |
|---|---|---|---|---|---|---|
| pH | Day 1 | 4.2 | 4.21 | 4.21 | 4.2 | 4.2 |
|   | Day 7 | 4.05 | 4.03 | 4.03 | 4.03 | 4.03 |
|   | Day 14 | 3.88 | 3.87 | 3.85 | 3.86 | 3.85 |
|   | Day 21 | 3.8 | 3.81 | 3.82 | 3.8 | 3.81 |
| Separation of whey (mm) | Day 7 | 5 | 7 | 7 | 6 | 7 |
|   | Day 14 | 9 | 16 | 12 | 14 | 17 |
|   | Day 21 | 12 | 20 | 15 | 18 | 22 |

TABLE 4-continued

|  |  | A | B | C | D | E |
|---|---|---|---|---|---|---|
| Sedimentation at the bottle bottom (%) | Day 7 | 1.75 | 1.7 | 16.8 | 1.73 | 1.9 |
|  | Day 14 | 2.1 | 2.27 | 20.3 | 2.22 | 2.35 |
|  | Day 21 | 2.28 | 2.6 | 2.38 | 2.52 | 2.8 |

On the whole, when homogenization was performed twice, better stability was obtained. However, Sample E obtained through a process in which fermented milk underwent two consecutive homogenization treatments exhibited lower stability than did samples in which fermented milk was homogenized only once. Sample A exhibited the highest stability.

Test Example 3

Study on the point(s) within the production process at which homogenization is performed and the number of repetitions of homogenization:

Fermented milk, syrup solution, soybean polysaccharide solution, and skim milk powder solution were prepared individually, and products were manufactured through thirty-five different methods described below, in which addition order and position of homogenization were combined in different ways. In search of the optimum production method for obtaining products endowed with stable storage properties, the products were tested for their storage stability. The products were evaluated after they were stored at 10° C., and similar to the case of Example 1, the amount of separated whey and the amount of sediment at the bottom of the bottle were used as indices for evaluation.

1) Preparation of Ingredient Solutions

Fermented milk: 16% skim milk powder solution was sterilized, and then was inoculated with Lactobacillus casei (FERM BP-1366) to culture until the solution had pH 3.7.

Syrup solution: 60% fructose was dissolved in 60° C. water, and sterilized at 100° C. for 5 minutes to prepare a syrup solution.

Soybean polysaccharide solution: 3.17% soybean polysaccharide (SM-900) was dissolved in water, and was sterilized at 100° C. for 5 minutes to prepare a soybean polysaccharide solution.

Skim milk powder solution: Skim milk powder was dissolved in 60° C. water, and was sterilized at 100° C. for 5 minutes to prepare 30% skim milk powder solution.

2) Production Method

The raw materials shown in Table 5 were mixed or homogenized in order of appearance from top to bottom, to thereby obtain end products. Mark "+" in Table 5 indicates homogenization treatment, and ingredients in brackets were mixed in advance. The mixing proportions of respective solutions were as follows: fermented milk (205 parts by weight), syrup solution (95 parts by weight), soybean polysaccharide solution (95 parts by weight), and skim milk powder solution (22 parts by weight). Water (600 parts by weight) was added to the resultant mixture to yield a final

TABLE 5

| K-1 | K-2 | K-3 | K-4 | K-5 | K-6 | K-7 | K-8 | K-9 | K-10 | K-11 | K-12 |
|---|---|---|---|---|---|---|---|---|---|---|---|
| fm+ | fm+ | fm+ | fm+ | fm+ | fm+ | fm+ | fm+ | fm+ | fm+ | fm+ | fm+ |
| smp | smp | smp | smp | sps | sps | sps | sps | syrup | syrup | syrup | [smp |
| + | sps | sps | syrup | smp | smp | syrup | [smp | smp | smp | [smp | sps] |
| sps | + | syrup | + | + | syrup | smp | syrup] | + | sps | sps] | + |
| syrup | syrup | + | sps | syrup | + | + | + | sps | + | + | syrup |

| K-13 | K-14 | K-15 | K-16 | K-17 | K-18 | K-19 | K-20 | K-21 | K-22 | K-23 | K-24 |
|---|---|---|---|---|---|---|---|---|---|---|---|
| fm+ | fm+ | fm+ | fm+ | fm | fm | fm | fm | fm | fm | fm | fm |
| [smp | [smp | [smp | smp | smp | smp | smp | smp | smp | sps | sps | sps |
| sps] | syrup] | syrup] | sps | + | + | + | sps | syrup | + | + | + |
| syrup | + | sps | syrup] | sps | sps | syrup | + | + | smp | smp | syrup |
| + | sps | + | + | + | syrup | + | syrup | sps | + | syrup | smp |
|  |  |  |  | syrup | + | sps | + | + | syrup | + | + |

| | K-25 | K-26 | Control | K-27 | K-28 | K-29 | K-30 | K-31 | K-32 | K-33 | K-34 |
|---|---|---|---|---|---|---|---|---|---|---|---|
| | fm | fm | fm | fm | fm | fm | fm | fm | fm | fm | fm |
| | sps | sps | sps | sps | syrup | syrup | syrup | syrup | syrup | [smp | [smp |
| | + | smp | smp | syrup | + | + | + | + | smp | sps] | syrup] |
| | [smp | + | syrup | + | smp | smp | sps | [smp | + | + | + |
| | syrup] | syrup | + | smp | + | sps | smp | sps] | sps | syrup | sps |
| | + | + | + | + | sps | + | + | + | + | + | + | smp = skim milk powder
fm = fermented milk
syrup = syrup solution product. The pressure applied during homogenization was 150 kg/cm². The following five different methods were used.
sps=soybean polysaccharide solution
3) Stability Data Related to Each Series Are shown in Table 6 of sediment at the bottom of the bottle. The pressure applied during homogenization was 150 kg/cm².
1) Preparation of Ingredient Solutions
Fermented milk: 16% skim milk powder solution was dissolved in 60° C. water and sterilized. The resultant

TABLE 6

| | K-1 | K-2 | K-3 | K-4 | K-5 | K-6 | K-7 | K-8 | K-9 | K-10 | K-11 | K-12 | K-13 | K-14 | K-15 | K-16 | K-17 | K-18 |
|---|---|---|---|---|---|---|---|---|---|---|---|---|---|---|---|---|---|---|
| pH | | | | | | | | | | | | | | | | | | |
| Day 0 | 4.09 | 4.09 | 4.1 | 4.09 | 4.11 | 4.11 | 4.11 | 4.11 | 4.12 | 4.11 | 4.12 | 4.11 | 4.11 | 4.11 | 4.11 | 4.12 | 4.12 | 4.12 |
| Day 7 | 3.99 | 3.97 | 3.98 | 4.02 | 3.99 | 3.98 | 3.98 | 3.98 | 3.98 | 3.98 | 3.98 | 3.98 | 3.97 | 3.98 | 3.98 | 3.98 | 4.02 | 4.01 |
| Day 14 | 3.91 | 3.9 | 3.89 | 3.95 | 3.88 | 3.89 | 3.89 | 3.9 | 3.88 | 3.89 | 3.88 | 3.88 | 3.87 | 3.87 | 3.87 | 3.9 | 3.9 | 3.89 |
| Separation of whey (mm) | | | | | | | | | | | | | | | | | | |
| Day 4 | 4 | 3 | 4 | 4 | 3 | 3 | 3 | 3 | 4 | 2 | 3 | 3 | 2 | 4 | 3 | 4 | 4 | 3 |
| Day 7 | 9 | 4 | 5 | 4 | 4 | 4 | 4 | 3 | 5 | 3 | 4 | 4 | 3 | 5 | 4 | 4 | 6 | 5 |
| Day 14 | 15 | 7 | 6 | 6 | 7 | 6 | 7 | 8 | 15 | 8 | 7 | 6 | 6 | 11 | 8 | 7 | 12 | 10 |
| Sedimentation at the bottle bottom (%) | | | | | | | | | | | | | | | | | | |
| Day 4 | 0.89 | 0.64 | 0.72 | 0.6 | 0.55 | 0.6 | 0.58 | 0.64 | 0.73 | 0.7 | 0.58 | 0.62 | 0.51 | 0.6 | 0.63 | 0.56 | 0.83 | 0.76 |
| Day 7 | 1.16 | 0.82 | 0.91 | 0.88 | 0.75 | 0.9 | 0.69 | 0.79 | 1.15 | 0.99 | 0.78 | 0.8 | 0.66 | 0.9 | 0.88 | 0.76 | 1.05 | 1.04 |
| Day 14 | 1.51 | 1.11 | 1.29 | 1.29 | 1.07 | 1.28 | 1.13 | 1.15 | 1.61 | 1.39 | 1.09 | 1.11 | 1.03 | 1.31 | 1.2 | 1.04 | 1.51 | 1.62 |

| | K-19 | K-20 | K-21 | K-22 | K-23 | K-24 | K-25 | K-26 | K-27 | K-28 | K-29 | K-30 | K-31 | K-32 | K-33 | K-34 | Control |
|---|---|---|---|---|---|---|---|---|---|---|---|---|---|---|---|---|---|
| pH | | | | | | | | | | | | | | | | | |
| Day 0 | 4.1 | 4.12 | 4.12 | 4.1 | 4.1 | 4.1 | 4.09 | 4.1 | 4.08 | 4.13 | 4.13 | 4.13 | 4.13 | 4.1 | 4.12 | 4.12 | 4.11 |
| Day 7 | 3.99 | 3.98 | 3.99 | 4.01 | 4.01 | 4.01 | 4 | 4.02 | 3.99 | 4.06 | 4.05 | 4.06 | 4.04 | 4 | 3.99 | 4.02 | 4.02 |
| Day 14 | 3.9 | 3.91 | 3.9 | 3.91 | 3.89 | 3.9 | 4.91 | 3.91 | 3.89 | 4 | 4.01 | 3.99 | 4 | 3.9 | 3.99 | 3.89 | 3.95 |
| Separation of whey (mm) | | | | | | | | | | | | | | | | | |
| Day 4 | 7 | 3 | 4 | 4 | 3 | 3 | 3 | 3 | 3 | 8 | 3 | 3 | 4 | 2 | 4 | 3 | 5 |
| Day 7 | 7 | 7 | 5 | 6 | 5 | 5 | 5 | 5 | 4 | 18 | 4 | 4 | 4 | 5 | 4 | 5 | 5 |
| Day 14 | 10 | 9 | 10 | 10 | 7 | 8 | 8 | 7 | 6 | 23 | 9 | 8 | 7 | 6 | 6 | 7 | 8 |
| Sedimentation at the bottle bottom (%) | | | | | | | | | | | | | | | | | |
| Day 4 | 0.98 | 0.83 | 1.03 | 0.64 | 0.69 | 0.67 | 0.65 | 0.58 | 0.63 | 0.74 | 0.71 | 0.71 | 0.53 | 0.53 | 0.71 | 0.65 | 0.66 |
| Day 7 | 1.09 | 1.14 | 1.37 | 0.69 | 0.7 | 0.76 | 0.67 | 0.87 | 0.75 | 0.94 | 0.95 | 0.95 | 0.84 | 0.7 | 0.75 | 0.79 | 0.88 |
| Day 14 | 1.67 | 1.71 | 1.92 | 1.2 | 1.35 | 1.17 | 1.15 | 1.43 | 1.34 | 1.4 | 1.59 | 1.54 | 1.23 | 1.13 | 0.99 | 1.29 | 1.42 |

As is apparent from Table 6, in the cases in which fermented milk was first homogenized, soybean polysaccharide solution was added thereto, and subsequently a second step of homogenization was performed, stable milk beverages were obtained. When skim milk powder solution was added to fermented milk before the fermented milk was homogenized, considerable amounts of sedimentation resulted. Also, when soybean polysaccharide solution was not subjected to homogenization, the amount of separated whey was considerable. Further, when soybean polysaccharide solution and skim milk powder solution were mixed in advance, particularly excellent stability was obtained.

Example 1

Study of Amount of Stabilizer

According to the K-3 method in Test Example 3 (see Table 5), fermented dairy products were produced. Soybean polysaccharide (SM-900) was used as a stabilizer, and three different products were produced such that the concentrations of the stabilizer in end products were 0.2, 0.25, and 0.3. The resultant products were stored at 10° C., and were compared in terms of storage stability by use, as indices for evaluation, of the amount of separated whey and the amount solution was inoculated with *Lactobacillus casei* (FERM BP-1366) to culture until the pH of the solution became 3.7.
Syrup solution: 55% fructose was dissolved in 60° C. water, and sterilized to prepare a syrup solution.
Soybean polysaccharide solution A: Soybean polysaccharide (SM-900) was dissolved in water, and sterilized to prepare a 2.1% soybean polysaccharide solution.
Soybean polysaccharide solution B: In a similar manner, 2.6% soybean polysaccharide solution was prepared.
Soybean polysaccharide solution C: In a similar manner, 3.1% soybean polysaccharide solution was prepared.
Skim milk powder solution: Skim milk powder was dissolved in 60° C. water, and sterilized at 100° C. for 5 minutes to prepare a 30% solution.
2) Production of Fermented Dairy Products
Sample A: fermented milk (454 parts by weight), syrup solution (242 parts by weight), soybean polysaccharide solution A (242 parts by weight), and skim milk powder solution (62 parts by weight) were mixed. Water (1500 parts by weight) was added to the resultant mixture to yield a product of Sample A.
Sample B: fermented milk (454 parts by weight), syrup solution (242 parts by weight), soybean polysaccharide solution B (242 parts by weight), and skim milk powder solution (62 parts by weight) were mixed. Water (1500 parts by weight) was added to the resultant mixture to yield a product of Sample B.

Sample C: fermented milk (454 parts by weight), syrup solution (242 parts by weight), soybean polysaccharide solution C (242 parts by weight), and skim milk powder solution (62 parts by weight) were mixed. Water (1500 parts by weight) was added to the resultant mixture to yield a product of Sample C.

3) Results

Stability data related to each series are shown in Table 7.

TABLE 7

|  | Sample | | |
| --- | --- | --- | --- |
|  | Sample A | Sample B | Sample C |
| Stabilizer |  | SM-900 |  |
| Homogenization pressure (kg/cm$^2$) | 150 | 150 | 150 |
| Amount of SM-900 added | 0.3 | 0.25 | 0.2 |
| pH |  —  |  —  |  —  |
| 0 | 4.13 | 4.12 | 4.12 |
| 4 | 4.05 | 4.05 | 4.04 |
| 7 | 3.98 | 3.98 | 3.98 |
| 14 | 3.96 | 3.96 | 3.96 |
| 21 | 3.94 | 3.94 | 3.94 |
| W.O. (mm) |  |  |  |
| 4 | 5 | 5 | 5 |
| 7 | 6 | 6 | 6 |
| 14 | 7 | 8 | 9 |
| 21 | 11 | 11 | 12 |
| Amount of sedimentation (wt. %) |  |  |  |
| 4 | 0.59 | 0.52 | 0.53 |
| 7 | 0.71 | 0.66 | 0.75 |
| 14 | 0.92 | 1.04 | 1.04 |
| 21 | 1.38 | 1.30 | 1.46 |

As is apparent from Table 7, even when the concentration of added soybean polysaccharide was 0.2%, a stability equal to that obtained by addition of 0.3% soybean polysaccharide was achieved.

Example 2

Study of Flavor

Comparative Example 1

Fermented milk: 16% skim milk powder which had been sterilized was inoculated with *Lactobacillus casei* (FERM BP-1366) to culture until the pH of the solution became 3.6.

Syrup solution: Fructose, Aspartame, and soybean polysaccharide were dissolved in 60° C. water, and sterilized to prepare a syrup solution. The concentrations of respective ingredients in end products were as follows: fructose; 5% and soybean polysaccharide; 0.3%. The above-mentioned fermented milk was homogenized by the application of a pressure of 150 kg/cm$^2$, and to the resultant homogenized mixture, syrup solution was added, and then water was added thereto to produce a fermented dairy product.

Comparative Example 2

The procedures of Comparative Example 1 were repeated except that the final concentration of soybean polysaccharide was 0.4%, to produce a fermented dairy product.

Comparative Example 3

The procedures of Comparative Example 1 were repeated except that the final concentration of soybean polysaccharide was 0.5%, to produce a fermented dairy product.

Comparative Example 4

The procedures of Comparative Example 1 were repeated except that the final concentration of soybean polysaccharide was 0.6%, to produce a fermented dairy product.

Comparative Example 5

The procedures of Comparative Example 1 were repeated except that the soybean polysaccharide was not used, but pectin (JMJ-150J, manufactured by CPF) was used as a stabilizer at a final concentration of 0.3%, to produce a fermented dairy product.

Comparative Example 6

The procedures of Comparative Example 5 were repeated through use of pectin (AYD-30, manufactured by SKW), to thereby produce a fermented dairy product.

Comparative Example 7

The procedures of Comparative Example 1 were repeated through use, as a stabilizer, of CMC (carboxymethylcellulose, Serogen F-815A, manufactured by Daiichikogyoseiyaku) at a final concentration of 0.3%, to produce a fermented dairy product.

Comparative Example 8

The procedures of Comparative Example 1 were repeated except that PGA (propylene glycol alginate, PF.R-4107, manufactured by Kibun Food Chemipha) was used as a stabilizer at a final concentration of 0.3%, to produce a fermented dairy product.

Example of Invention

Fermented milk and syrup solution having the same compositions as those used in Comparative Example 1 were prepared, and a fermented dairy product was produced in a manner similar to that used for Sample A (see Test Example 2).

The fermented dairy products produced from Comparative Examples 1 to 8 and "Example of Invention" were tested for their flavor by a panel of five experts. The results are shown in Table 8.

TABLE 8

| Sample | | Evaluation | Judgement |
| --- | --- | --- | --- |
| Comp. Ex. 1 | 0.3% | Refreshing, light | A |
| Comp. Ex. 2 | 0.4% | Refreshing, tint of harsh taste | A |
| Comp. Ex. 3 | 0.5% | Voluminous, slightly tannic | B |
| Comp. Ex. 4 | 0.6% | Heavy, sweet, slightly tannic | B |
| Comp. Ex. 5 | 0.3% | Viscous and heavy | C |
| Comp. Ex. 6 | 0.3% | Melting and thick | C |
| Comp. Ex. 7 | 0.3% | Slightly thick and rich | B |
| Comp. Ex. 8 | 0.3% | Heavy and bitter; granules | C |
| Invention Example | 0.3% |  | A |

As is apparent from Table 8, the fermented dairy products containing a stabilizer other than soybean polysaccharide did not provide good flavor. Also, even in the case in which soybean polysaccharide was added, addition in amounts of 0.6% or more caused the product to have a slightly tannic taste.

As described hereinabove, the production method of the present invention provides stable acidic milk beverages which undergo less sedimentation or separation of whey during product storage.

Moreover, the acidic milk beverages obtained through the method of the present invention have better sensory quality—e.g., less viscosity—as compared with the case in which stabilizers other than soybean polysaccharide as used in the present invention are used.

What is claimed is:

1. A method for producing a syrup-containing acidic milk beverage, comprising:
   a) homogenizing a fermented milk in a homogenizer under a pressure of about 150 kg/cm$^2$;
   b) adding a soybean polysaccharide in an amount of 0.1–0.6 wt % based on the total weight of the acidic milk beverage to the homogenized fermented milk, said soybean polysaccharide having a molecular weight of 1,000,000 or less as measured by the limiting viscosity method using standard pullulan as a standard substance; and
   c) homogenizing the fermented milk containing the added soybean polysaccharide in a homogenizer.

2. The method of claim 1, wherein the acidic milk beverage has a pH of less than 4.6.

3. The method of claim 1, wherein the fermented milk is solely homogenized without any other ingredients being added.

4. The method of claim 1, wherein the soybean polysaccharide is mixed with a dairy product, and then added to the fermented milk.

5. A method for producing a syrup-containing acidic milk beverage comprising:
   a) homogenizing fermented milk in a homogenizer under a pressure of about 150 kg/cm$^2$;
   b) adding thereto a mixture of soybean polysaccharide in an amount of 0.1–0.6 wt % based on the total weight of the acidic milk beverage and a dairy product, said soybean polysaccharide having a molecular weight of 1,000,000 or less as measured by the limiting viscosity method using standard pullulan as a standard substance; and
   c) homogenizing the fermented milk containing the added soybean polysaccharide and dairy product in a homogenizer.

6. The method of claim 5, wherein the dairy product is reconstitute milk, skim milk powder, fresh milk, whole milk powder or fresh cream.

7. The method of claim 5, wherein the acidic milk beverage has a pH of less than 4.6.

8. The method of claim 5, wherein the fermented milk is solely homogenized without any other ingredients being added.

9. The method of claim 5, wherein the soybean polysaccharide is mixed with a dairy product, and then added to the fermented milk.

* * * * *